United States Patent
Iyer et al.

(10) Patent No.: US 11,290,458 B1
(45) Date of Patent: Mar. 29, 2022

(54) SMART PERIPHERAL DEVICE FOR AN INFORMATION HANDLING SYSTEM

(71) Applicant: Dell Products L.P., Round Rock, TX (US)

(72) Inventors: Vivek Viswanathan Iyer, Austin, TX (US); Daniel Lawrence Hamlin, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/032,761

(22) Filed: Sep. 25, 2020

(51) Int. Cl.
| | |
|---|---|
| *H04L 29/06* | (2006.01) |
| *G06F 13/10* | (2006.01) |
| *H04L 29/08* | (2006.01) |
| *H04L 65/60* | (2022.01) |
| *H04L 67/141* | (2022.01) |
| *H04L 67/10* | (2022.01) |

(52) U.S. Cl.
CPC ............ *H04L 63/10* (2013.01); *G06F 13/102* (2013.01); *H04L 65/607* (2013.01); *H04L 67/10* (2013.01); *H04L 67/141* (2013.01)

(58) Field of Classification Search
CPC ............ G06F 2209/509; G06F 9/5044; G06F 9/5027; G06F 9/5055; G06F 13/102; H04L 67/04; H04L 67/10; H04L 63/10; H04L 65/607; H04L 67/141
See application file for complete search history.

(56) References Cited

U.S. PATENT DOCUMENTS

| | | | | |
|---|---|---|---|---|
| 6,141,705 A | * | 10/2000 | Anand ................. | G06F 9/5044 709/203 |
| 11,087,029 B1 | * | 8/2021 | Satpathy ............... | H04L 9/0668 |
| 2007/0098010 A1 | * | 5/2007 | Dube .................... | H04L 69/32 370/463 |
| 2007/0130352 A1 | * | 6/2007 | Chhabra ................ | H04L 69/22 709/230 |
| 2010/0131669 A1 | * | 5/2010 | Srinivas ................. | G06F 9/452 709/233 |
| 2015/0095920 A1 | * | 4/2015 | Jeaugey ............... | G06F 9/5027 718/104 |

(Continued)

*Primary Examiner* — David R Lazaro
(74) *Attorney, Agent, or Firm* — Baker Botts L.L.P.

(57) ABSTRACT

In one embodiment, a method for offloading one or more tasks from an information handling system to a smart peripheral device in a computing environment includes establishing a connection between the smart peripheral device and the information handling system; receiving a user identification from the information handling system indicating a user of the information handling system; receiving a query from the information handling system requesting a capabilities inventory of the smart peripheral device indicating the one or more tasks to be offloaded; determining user permissions based on a configuration policy of the smart peripheral device; generating the capabilities inventory based on the user permissions; sending the capabilities inventory to the information handling system; receiving one or more commands from the information handling system indicating the one or more tasks to be offloaded from the information handling system to the smart peripheral device; and executing the one or more commands.

20 Claims, 4 Drawing Sheets

(56) References Cited

U.S. PATENT DOCUMENTS

| | | | |
|---|---|---|---|
| 2016/0095057 A1* | 3/2016 | Guy | H04W 8/24 |
| | | | 709/224 |
| 2017/0317946 A1* | 11/2017 | Ji | H04W 36/24 |
| 2017/0371829 A1* | 12/2017 | Chen | G06F 13/4282 |
| 2018/0039519 A1* | 2/2018 | Kumar | G06F 9/4812 |
| 2018/0183855 A1* | 6/2018 | Sabella | G06F 9/505 |
| 2019/0342743 A1* | 11/2019 | Marchand | H04W 76/19 |
| 2021/0067584 A1* | 3/2021 | Nguyen | G06F 1/3234 |

* cited by examiner

SMART PERIPHERAL DEVICE FOR AN INFORMATION HANDLING SYSTEM

BACKGROUND

Field of the Disclosure

The disclosure relates generally to information handling systems, and in particular to a smart peripheral device for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed smart peripheral device configured to offload one or more tasks from an information handling system to the smart peripheral device in a computing environment includes a controller and a memory medium coupled to the controller that includes instructions executed by the controller causing the smart peripheral device to: establish a connection between the smart peripheral device and the information handling system, the connection communicably coupling the smart peripheral device to the information handling system; receive a user identification (ID) from the information handling system, the user ID indicating a user of the information handling system; receive a query from the information handling system, the query requesting a capabilities inventory of the smart peripheral device, the capabilities inventory indicating the one or more tasks to be offloaded from the information handling system to the smart peripheral device; determine user permissions based on a configuration policy of the smart peripheral device, the configuration policy indicating one or more permissions associated with the user ID; generate the capabilities inventory based on the user permissions; send the capabilities inventory to the information handling system; receive one or more commands from the information handling system, the one or more commands indicating the one or more tasks to be offloaded from the information handling system to the smart peripheral device; and execute the one or more commands.

In one or more of the disclosed embodiments, to determine user permissions based on the configuration policy of the smart peripheral device, the instructions further cause the smart peripheral device to: send the user ID to a management backend of the computing environment, the management backend configured to generate the configuration policy based on the user ID; and receive the configuration policy from the management backend.

In one or more of the disclosed embodiments, to execute the one or more commands, the instructions further cause the smart peripheral device to: receive a plurality of data streams from a plurality of peripheral devices communicatively coupled to the smart peripheral device; encode the plurality of data streams; refrain from sending the encoded plurality of data streams to the information handling system; and send the encoded plurality of data streams to an infrastructure access point of the computing environment, the infrastructure access point communicatively coupling the smart peripheral device to a network of the computing environment.

In one or more of the disclosed embodiments, to execute the one or more commands, the instructions further cause the smart peripheral device to: receive an encoded data stream from the information handling system, the encoded data stream sent to the information handling system from an infrastructure access point of the computing environment, the infrastructure access point communicatively coupling the information handling system to a network of the computing environment; decode the encoded data stream; and send the decoded data stream to a plurality of peripheral devices for presentation to the user of the information handling system, the plurality of peripheral devices communicatively coupled to the smart peripheral device.

In one or more of the disclosed embodiments, to execute the one or more commands, the instructions further cause the smart peripheral device to: execute an application via an operating system of the smart peripheral device, the application generating one or more results; send the one or more results to the information handling system for processing; and send the one or more results to a plurality of peripheral devices for presentation to the user of the information handling system, the plurality of peripheral devices communicatively coupled to the smart peripheral device.

In one or more of the disclosed embodiments, the connection between the smart peripheral device and the information handling system is a wireless data connection.

In one or more of the disclosed embodiments, the wireless data connection is associated with a media-agnostic universal serial bus (MA-USB) protocol.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a smart peripheral device that includes a controller configured to: establish a connection between the smart peripheral device and the information handling system, the connection communicably coupling the smart peripheral device to the information handling system; receive a user identification (ID) from the information handling system, the user ID indicating a user of the information handling system; receive a query from the information handling system, the query requesting a capabilities inventory of the smart peripheral device, the capabilities inventory indicating the one or more tasks to be offloaded from the information handling system to the smart peripheral device; determine user permissions based on a configuration policy of the smart peripheral device, the configuration policy indicating one or more permissions associated with the user ID; generate the capabilities inventory based on the user permissions; send the capabilities inventory to the information handling system; receive one or more commands from the information handling system, the one or more commands indicating the one or more tasks to be offloaded from the information handling system to the smart peripheral device; and execute the one or more commands.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
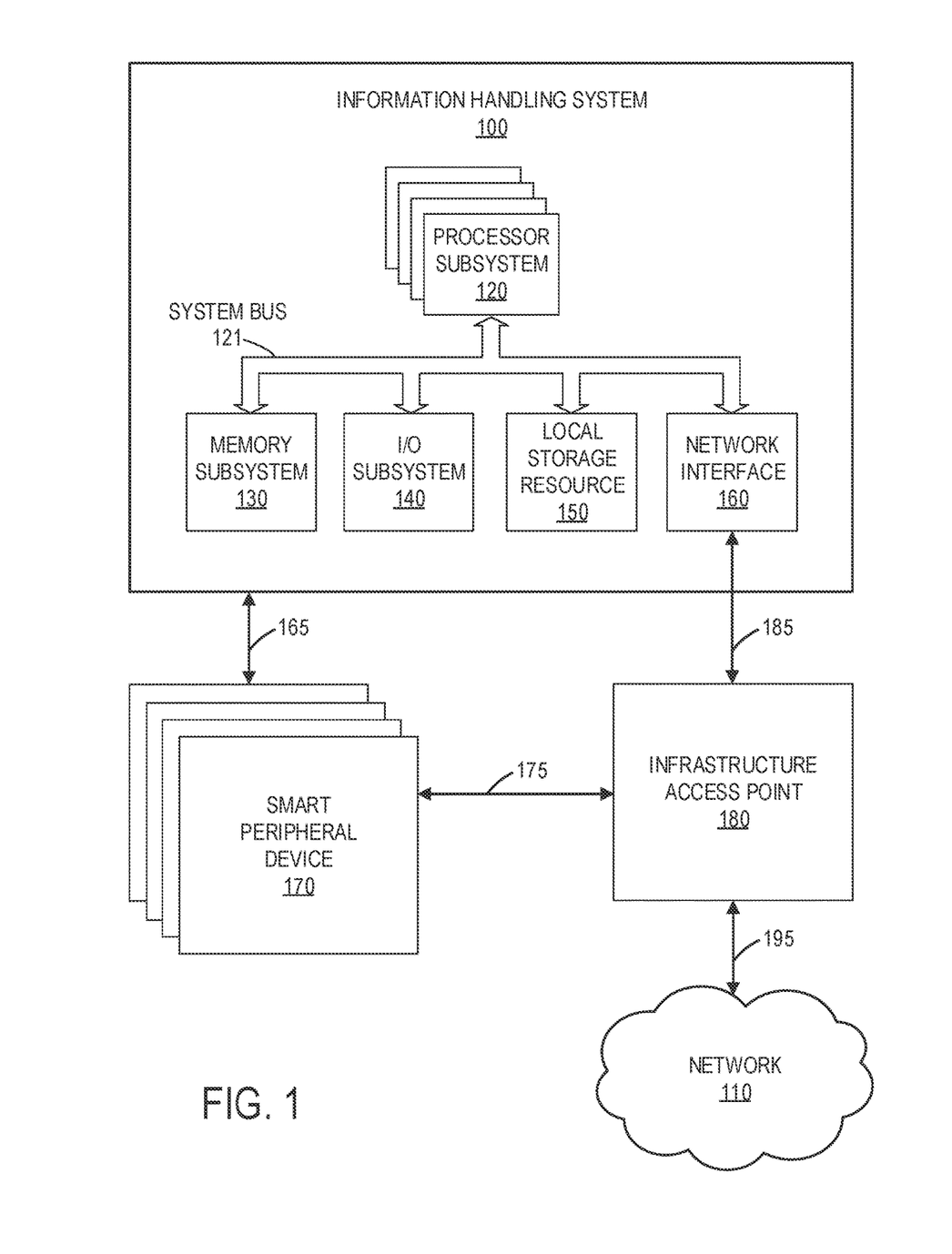
FIG. 1 is a block diagram of selected elements of an embodiment of a computing environment that includes smart peripheral devices.

Turning now to the drawings, FIG. 1 is a block diagram of selected elements of an embodiment of a computing environment that includes smart peripheral devices. In the embodiment illustrated in FIG. 1, computing environment 190 includes a network 110 communicatively coupled to an infrastructure access point 180 via connection 195. Infrastructure access point 180 may additionally be communicatively coupled to information handling system 100 and smart peripheral device 170 via connections 185 and 175, respectively. Information handling system 100 and smart peripheral device 170 may be communicatively coupled via connection 165. It is noted that although computing environment 190 includes network 110, infrastructure access point 180, information handling system 100, and smart peripheral device 170 in the embodiment illustrated in FIG. 1, other embodiments of computing environment 190 may include additional, fewer, and/or different elements and connections.

In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In one embodiment, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In one embodiment, local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 160 may be a suitable system, apparatus, or device operable to serve as an interface between information handling system 100 and a network 110. Network interface 160 may enable information handling system 100 to communicate over network 110 (e.g., via infrastructure access point 180) using a suitable transmission protocol and/or standard, including, but not limited to, transmission protocols and/or standards enumerated below with respect to the discussion of network 110. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets.

As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In the embodiment illustrated in FIG. 1, information handling system 100 may be communicably coupled to infrastructure access point 180 via connection 185 such that information handling system 100 may access network 110. For example, information handling system 100 may access websites, streaming services, business portals, and/or peripheral devices disposed throughout a business enterprise via infrastructure access point 180. Additionally, information handling system 100 may be communicably coupled to smart peripheral device 170 via connection 165 such that information handling system 100 may access one or more services, or "capabilities," installed on, or otherwise supported by, smart peripheral device 170. Specifically, information handling system 100 may query smart peripheral device 170 via connection 165 to determine capabilities of smart peripheral device 170 and may subsequently offload one or more processes, or "tasks," to smart peripheral device 170 in accordance with the capabilities of smart peripheral device 170. Here, information handling system 100 may offload one or more tasks to smart peripheral device 170 in response to various workflows or processes within computing environment 190. For example, information handling system 100 may offload one or more tasks to smart peripheral device 170 in response to an increased workload requiring additional processing capabilities, or while executing a distributed program that requires distributed computing over network 110. In one embodiment, information handling system 100 may offload one or more tasks by sending smart peripheral device 170 one or more commands indicating the one or more tasks to be offloaded to smart peripheral device 170. In response, smart peripheral device 170 may execute the one or more commands thereby offloading the one or more tasks from information handling system 100. By offloading one or more tasks to smart peripheral device 170, information handling system 100 may dedicate compute cycles to other tasks, complete large tasks more efficiently, decrease wear on sensitive components (e.g., such as CPU, GPU, and the like), and increase redundancy across distributed computing devices. In one embodiment, information handling system 100 may alternatively access smart peripheral device 170 via connections 185 and 175 (i.e., via infrastructure access point 180). For example, information handling system 100 may be communicably coupled to smart peripheral device 170 via connections 185 and 175 if connection 165 cannot be established, cannot be maintained, and/or provides a slower connection speed than connections 185 and 175.

In one embodiment, connection 165 may be or include a wireless data connection. For example, connection 165 may be or include a wireless data connection having a media-agnostic universal serial bus (MA-USB) protocol. Other examples of this wireless data connection may be or include a USB over TCP/IP connection, a WiGig connection, and/or any other wireless data connection suitable for communicably coupling information handling system 100 to smart peripheral device 170. In one embodiment, connection 165 may include an inherent latency in wireless data transmission between information handling system 100 and smart peripheral device 170. In other embodiments, connection 165 may be or include a wired data connection. For example, connection 165 may be or include an ethernet connection, a digital subscriber line (DSL) connection, a coaxial cable connection, a fiber optic connection, and/or any other wired data connection suitable for communicably coupling information handling system 100 to smart peripheral device 170.

In one embodiment, infrastructure access point 180 may be a suitable system, apparatus, or device operable to provide access to network 110 in computing environment 190. Specifically, infrastructure access point 180 may allow information handling system 100 and smart peripheral device 170 to access network 110 via connection 195. For example, infrastructure access point 180 may be or include a router used by information handling system 100 and smart peripheral device 170 for accessing various resources via network 110 such as the Internet and/or other peripheral devices disposed throughout a business enterprise. In one embodiment, infrastructure access point 180 may be used to manage information handling system 100 and smart peripheral device 170 via connections 185 and 175, respectively. Specifically, infrastructure access point 180 may receive device management data from network 110 via connection 195 and may provide the device management data to information handling system 100 and smart peripheral device 170 via connections 185 and 175. For example, infrastructure access point 180 may provide smart peripheral device 170 with firmware updates, operating system updates, anti-virus scans, application installers, and/or configuration policies via connection 175. It is noted that although a single infrastructure access point 180 is shown in the embodiment illustrated in FIG. 1, other embodiments of computing environment 190 may include any number of infrastructure access points 180 suitable for providing access to network 110. In such embodiments, information handling system 100 and smart peripheral device 170 may respectively be communicably coupled to the same infrastructure access point (as illustrated in FIG. 1) and/or to separate infrastructure access points. In one embodiment, connections 185 and 175 may be or include wireless data connections. For example, connections 185 and 175 may be or include a wireless local area network (WLAN) connection, a wireless personal area network (WPAN) connection, a wireless metropolitan area network (WMAN) connection, a cellular network connection, and/or any other wireless data connection suitable for providing wireless access to a network. In another embodiment, connections 185 and 175 may be or include wired data connections. For example, connections 185 and 175 may be or include an ethernet connection, a digital subscriber line (DSL) connection, a coaxial cable connection, a fiber optic connection, and/or any other wired data connection suitable for providing wired access to a network.

In one embodiment, smart peripheral device 170 may be a suitable system, apparatus, or device operable to offload one or more tasks from information handling system 100. In particular, smart peripheral device 170 may be or include a peripheral device communicatively coupled to information handling system 100 (e.g., via connection 165) that is configured by an administrator or business enterprise to include, or otherwise support, various capabilities. Smart peripheral device 170 may offload one or more tasks from information handling system 100 in accordance with these various capabilities. Specifically, smart peripheral device 170 may execute one or more commands received from information handling system 100 that correspond to one or more tasks to be offloaded based, in part, on capabilities supported by smart peripheral device 170. In one embodiment, smart peripheral device 170 may be or include a docking station within computing environment 190. In this embodiment, examples of capabilities associated with smart peripheral device 170 may include a type of operating system installed on the docking station, types of applications installed on the docking station, types of hardware available within the docking station, types of peripheral devices communicably coupled to the docking station, processing capabilities of the docking station, and the like. In another embodiment, smart peripheral device 170 may be or include a printer within computing environment 190. In this embodiment, examples of capabilities associated with smart peripheral device 170 may include an ability to print in color, available printing sizes, available printing formats, available pages per minute (PPM), etc. In yet another embodiment, smart peripheral device 170 may be or include a router within computing environment 190. In this embodiment, examples of capabilities associated with smart peripheral device 170 may include an available bandwidth, load-balancing capabilities, a router type (i.e., wireless router, wired router, edge router, core router), etc. In yet another embodiment, smart peripheral device 170 may be or include a scanner within computing environment 190. In this embodiment, examples of capabilities associated with smart peripheral device 170 may include a bit resolution, a signal-to-noise ration (SNR), an ability to scan photorealistic images, etc. In other embodiments, smart peripheral device 170 may be or include displays, photocopiers, storage devices, and/or any other type of peripheral device suitable for offloading one or more tasks from information handling system 100.

In one embodiment, computing environment 190 may include more than one smart peripheral device 170 (collectively referred to herein as "smart peripheral devices 170"). Specifically, smart peripheral devices 170 may be disposed throughout computing environment 190 such that each smart peripheral device 170 may be communicably coupled, consecutively or concurrently, to information handling system 100. This is illustrated in FIG. 1 where multiple smart peripheral devices 170 are shown communicatively coupled to information handling system 100 via connection 165. Here, each smart peripheral device 170 may additionally be communicatively coupled to infrastructure access point 180 via connection 175 and may receive device management data from infrastructure access point 180 as described above. In one embodiment, smart peripheral devices 170 disposed throughout computing environment 190 may be of a same type. For example, each smart peripheral device 170 may be or include a docking station configured to provide information handling system 100 with access to peripheral devices communicably coupled to smart peripheral device 170. In another embodiment, smart peripheral devices 170 disposed throughout computing environment 190 may be of different types. For example, 50% of smart peripheral devices 170 deployed throughout a business enterprise may be or include printers, 30% of smart peripheral devices 170 may be or include routers, and 20% of smart peripheral devices 170 may be or include scanners. Each smart peripheral device 170 disposed throughout computing environment may include a processor, or "controller," configured to execute one or more tasks offloaded from information handling system 100. Additionally, each smart peripheral device 170 may establish its own wireless, or wired, data connection with information handling system 100 for receiving one or more commands indicating one or more tasks to be offloaded. In particular, each smart peripheral device 170 may be communicably coupled to information handling system 100 via respective connections 165.

In one embodiment, smart peripheral device 170 may establish connection 165 with information handling system 100 based on a proximity of information handling system 100 in relation to smart peripheral device 170. For example, each smart peripheral device 170 may include a radio transmitter serving as a beacon that is discoverable by information handling system 100 within computing environment 190. In another embodiment, a user of information handling system 100 may manually select one or more smart peripheral devices 170 for use (e.g., based on capabilities). For example, information handling system 100 may present an interface to a user via a display of information handling system 100 that includes a drop-down menu listing smart peripheral devices 170 and their respective capabilities within a business enterprise. Smart peripheral device 170 is described in greater detail with respect to FIG. 2.

Figure 2:
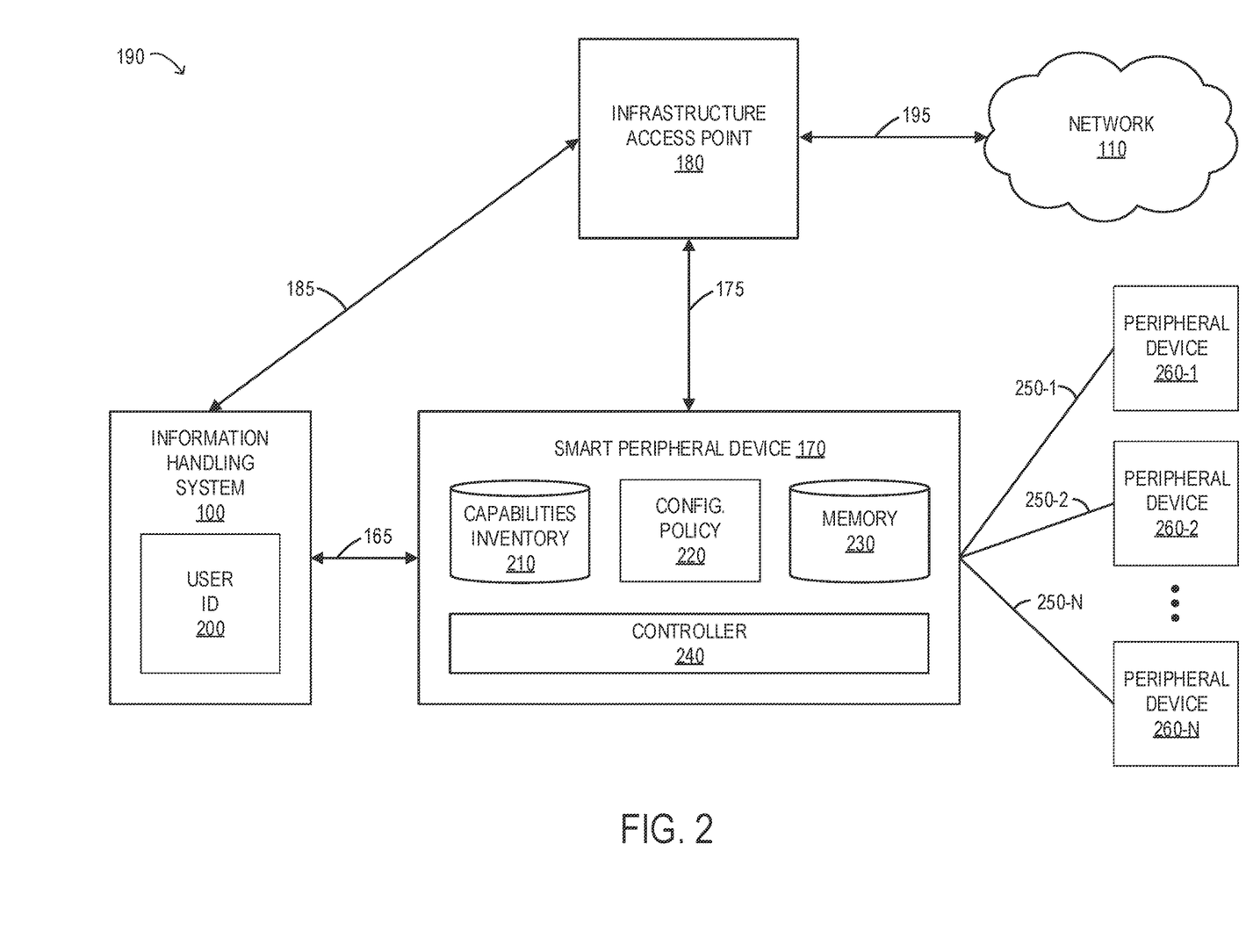
FIG. 2 is a block diagram of selected elements of an embodiment of a computing environment that includes peripheral devices coupled to a smart peripheral device.

FIG. 2 is a block diagram of selected elements of an embodiment of a computing environment that includes peripheral devices coupled to a smart peripheral device. In the embodiment illustrated in FIG. 2, computing environment 190 includes network 110, infrastructure access point 180, information handling system 100, and smart peripheral device 170 communicably coupled via connections 195, 185, 175, and 165 as described above with respect to FIG. 1. In addition, computing environment 190 includes peripheral devices 260-1 through 260-N (collectively referred to herein as "peripheral devices 260") communicatively coupled to smart peripheral device 170 via connections 250-1 through 250-N (collectively referred to herein as "connections 250"), respectively. In the embodiment illustrated in FIG. 2, smart peripheral device 170 is a docking station that includes capabilities inventory 210, configuration policy 220, memory 230, and controller 240. Information handling system 100 includes user identification (ID) 200. It is noted that although computing environment 190 includes network 110, infrastructure access point 180, information handling system 100, smart peripheral device 170, and peripheral devices 260 in the embodiment illustrated in FIG. 2, other embodiments of computing environment 190 may include additional, fewer, and/or different elements and connections.

In one embodiment, each peripheral device 260-1 through 260-N may be a suitable system, apparatus, or device operable to expand capabilities of smart peripheral device 170. Specifically, peripheral devices 260 may be or include input devices, output devices, and/or storage devices communicably coupled to smart peripheral device 170 via connections 250 such that peripheral devices 260 may interact with smart peripheral device 170. For example, peripheral device 260-1 illustrated in FIG. 2 may be or include a webcam operable to capture one or more images of a user of information handling system 100 during a video conference. In this example, the webcam may be communicably coupled to smart peripheral device 170 via connection 250-1. In another example, peripheral device 260-2 may be or include a computer headset operable to provide audio to a user of information handling system 100 via headphones of the computer headset and to capture audio input from the user via an embedded microphone of the computer headset. In this example, the computer headset may be communicably coupled to smart peripheral device 170 via connection 250-2. In yet another example, peripheral device 260-N may be or include a display operable to present one or more images to a user of information handling system 100 while smart peripheral device 170 is executing an application. In this example, the display may be communicably coupled to smart peripheral device 170 via connection 250-N.

In one embodiment, capabilities inventory 210 may be a suitable system, apparatus, or device operable to indicate one or more tasks to be offloaded to smart peripheral device 170. Specifically, capabilities inventory 210 may indicate to information handling system 100 one or more capabilities installed on, or otherwise supported by, smart peripheral device 170 such that information handling system 100 may offload one or more tasks indicated within capabilities inventory 210. In one embodiment, information handling system 100 may access capabilities inventory 210 via connection 165. In another embodiment, information handling system 100 may send a query to smart peripheral device 170 requesting access to data stored within capabilities inventory 210. In one embodiment, capabilities inventory 210 may be or include a relational database in which a description of each capability installed on, or otherwise supported by, smart peripheral device 170 is stored as an entry. That is, each entry stored within capabilities inventory 210 may describe a capability. For example, respective entries within capabilities inventory 210 may include a type of operating system installed on smart peripheral device 170, types of applications installed on smart peripheral device 170, types of hardware available within smart peripheral device 170, types of peripheral devices 260 communicably coupled to smart peripheral device 170, processing capabilities of smart peripheral device 170, storage capabilities of smart peripheral device 170, and the like. In other embodiments, capabilities inventory 210 may be or include a centralized database, distributed database, commercial database, operational database, and/or any other database management system suitable for indicating one or more tasks to be offloaded to smart peripheral device 170.

In one embodiment, configuration policy 220 may be a suitable system, apparatus, or device operable to indicate one or more permissions associated with users of information handling system 100. In particular, configuration policy 220 may be or include a configuration file used to configure various parameters and initial settings of applications, operating systems, or other capabilities, stored in smart peripheral device 170 (e.g., stored in memory 230). For example, various parameters and initial settings may include custom port numbers of one or more ports used to communicably couple smart peripheral device 170 to peripheral devices 260, language settings, security settings (i.e., user permissions), branding settings such as company logos within a business enterprise, and the like. In one embodiment, smart peripheral device 170 may include a static configuration policy 220. Here, each smart peripheral device 170 disposed throughout computing environment 190 may include a respective configuration policy 220 (e.g., stored in memory 230). In another embodiment, smart peripheral device 170 may include a dynamic configuration policy 220. That is, in response to receiving a query from information handling system 100 requesting access to data stored within capabilities inventory 210, smart peripheral device 170 may communicate with a management backend (not shown in figure) of computing environment 190 via network 110 to receive a dynamic configuration policy 220 generated by the management backend (e.g., based on user ID 200). In one embodiment, configuration policy 220 may be updated, or otherwise modified, by smart peripheral device 170 in response to receiving device management data from infrastructure access point 180 via connection 175 as described above.

In one embodiment, memory 230 may be a suitable system, apparatus, or device operable to retain and/or retrieve program instructions and/or data for a period of time (e.g., computer-readable media). Memory 230 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, controller 240 may be a suitable system, apparatus, or device operable to offload one or more tasks from information handling system 100. In particular, controller 240 may be or include a printed circuit board (PCB) configured to communicate with information handling system 100 such that smart peripheral device 170 may receive one or more commands indicating the one or more tasks to be offloaded from information handling system 100. In the embodiment illustrated in FIG. 2, controller 240 may establish connection 165 between smart peripheral device 170 and information handling system 100, thereby communicatively coupling smart peripheral device 170 to information handling system 100. Once communicatively coupled, controller 240 may identify a user of information handling system 100. Specifically, information handling system 100 may send user ID 200 to smart peripheral device 170 via connection 165. Controller 240 may receive user ID 200 from information handling system 100 to identify the user and determine one or more user permissions. In one embodiment, user ID 200 may be or include a username of a user logged in to information handling system 100. In other embodiments, user ID 200 may be or include an employee identification number, a user profile identification number, and/or any other identification used to indicate a user of information handling system 100.

In one embodiment, controller 240 may receive a query from information handling system 100 requesting capabilities of smart peripheral device 170. Specifically, controller 240 may receive a query requesting capabilities inventory 210, or access to the capabilities described therein, such that information handling system 100 may offload one or more tasks indicated within capabilities inventory 210. In response to receiving the query from information handling system 100, controller 240 may access configuration policy 220 to determine one or more user permissions associated with user ID 200. That is, configuration policy 220 may include various parameters and initial settings of applications, operating systems, or other capabilities, stored in smart peripheral device 170 (e.g., stored in memory 230) that correspond to a given user indicated by user ID 200. For example, a user of information handling system 100 may lack security clearance required to access peripheral device 260-1 illustrated in FIG. 2. In this example, configuration policy 220 of smart peripheral device 170 may indicate that user ID 200 must be associated with proper security clearance to access peripheral device 260-1. Thus, controller 240 may determine that the user corresponding to user ID 200 does not have user permissions to access peripheral device 260-1, therefore the capability associated with peripheral device 260-1 is denied, or otherwise unavailable, to the user. In another example, a user of information handling system 100 may have been granted the security clearance required to access peripheral device 260-1. In this example, configuration policy 220 of smart peripheral device 170 may again indicate that user ID 200 must be associated with proper security clearance to access peripheral device 260-1. Here, controller 240 may determine that the user corresponding to user ID 200 has user permissions to access peripheral device 260-1, therefore the capability associated with peripheral device 260-1 is granted, or otherwise available, to the user.

In one embodiment, controller 240 may generate capabilities inventory 210 based on user permissions associated with a user of information handling system 100. That is, controller 240 may identify a user of information handling system 100 based on user ID 200 and may generate one or more entries within capabilities inventory 210 indicating one or more tasks to be offloaded to smart peripheral device 170. In one embodiment, controller 240 may send capabilities inventory 210 to information handling system 100 once generated such that information handling system 100 may determine one or more tasks from capabilities inventory 210 to be offloaded to smart peripheral device 170. In another embodiment, information handling system 100 may access capabilities inventory 210 once generated via connection 165. Information handling system 100 may then send one or more commands to smart peripheral device 170 via connection 165, where each of the one or more commands may indicate a task to be offloaded to smart peripheral device 170. For example, a first command sent from information handling system 100 may instruct controller 240 to execute a video conference application installed on smart peripheral device 170 and a second command may instruct controller 240 to activate a webcam communicatively coupled to smart peripheral device 170 to capture one or more images of a user during a video conference. In response to receiving the one or more commands from information handling system 100, controller 240 may execute the one or more commands, thereby offloading the one or more tasks from information handling system 100.

In one embodiment, the one or more commands sent from information handling system 100 may instruct smart peripheral device 170 to decode an encoded data stream. Specifically, information handling system 100 may receive an encoded data stream, or encoded data streams, from network 110 via infrastructure access point 180 over connection 185. For example, a user of information handling system 100 may visit a video sharing website using a web browser installed on information handling system 100, causing information handling system 100 to receive an encoded data stream comprised of audio and video data. Conventionally, when communicably coupled to a wireless docking station for presenting decoded data streams, information handling system 100 may receive the encoded data stream, decode the data stream using a decoder (e.g., VP8 decoder, VP9 decoder, and the like), re-encode the data stream using a hardware encoder, then send the re-encoded data stream to the wireless docking station for decoding and rendering for presentation. However, this conventional decoding/re-encoding/decoding process may contribute to overall system latency in the wireless data transmission between information handling system 100 and a wireless docking station. In contrast, smart peripheral device 170 may reduce system latency by decoding an encoded data stream and sending the decoded data stream to peripheral devices 260 for display. In one embodiment, smart peripheral device 170 may receive an encoded data stream for decoding (rather than information handling system 100) directly from network 110 via infrastructure access point 180 over connection 175. In another embodiment, information handling system 100 may receive an encoded data stream from network 110 via infrastructure access point 180 over connection 185 and, rather than decoding and re-encoding the encoded data stream as described above, information handling system 100 may send the encoded data stream directly to smart peripheral device 170 for decoding. Information handling system 100 may then send one or more commands to smart peripheral device 170 instructing controller 240 to decode the encoded data stream, thereby offloading the task of decoding the encoded data stream and omitting the task of re-encoding the data stream using a hardware encoder. In one embodiment, once smart peripheral device 170 has decoded the encoded data stream, smart peripheral device 170 may send the decoded data stream to peripheral devices 260 for presentation to a user of information handling system 100.

In one embodiment, the one or more commands sent from information handling system 100 may instruct smart peripheral device 170 to redirect data streams generated by peripheral devices 260 communicatively coupled to smart peripheral device 170. In particular, smart peripheral device 170 may receive data streams from peripheral devices 260 communicatively coupled to smart peripheral device 170 via connections 250. For example, a user of information handling system 100 may visit a video conference website using a web browser installed on information handling system 100 such that peripheral devices 260 may capture audio and video data of the user during a video conference. Conventionally, when communicably coupled to information handling system 100, a wireless docking station may encode the data streams received from peripheral devices and send the encoded data streams to information handling system 100 via a wireless data connection. In response, information handling system 100 may receive the encoded data streams, decode the encoded data streams, re-encode the data streams, and send the re-encoded data streams to the video conference website for presentation to one or more participants in the video conference. However, sending the encoded data streams to information handling system 100 via wireless data connection such that information handling system 100 may decode and re-encode the data streams may contribute to latency in the video conference, thereby decreasing user experience. In contrast, smart peripheral device 170 may reduce latency by refraining from sending encoded data streams to information handling system 100. Rather, smart peripheral device 170 may encode data streams received from peripheral devices 260 and may send the encoded data streams directly to network 110 via infrastructure access point 180 over connection 175. Here, information handling system 100 may send one or more commands to smart peripheral device 170 instructing controller 240 to encode the data streams and to send the encoded data streams directly to network 110, thereby omitting the tasks of decoding and re-encoding data streams and offloading the task of sending the encoded data streams to network 110.

In one embodiment, the one or more commands sent from information handling system 100 may instruct smart peripheral device 170 to execute one or more applications installed on smart peripheral device 170 (e.g., stored in memory 230). Here, information handling system 100 may offload one or more tasks to smart peripheral device 170 in response to various workflows or processes within computing environment 190. In one embodiment, information handling system 100 may offload one or more tasks to smart peripheral device 170 in response to an increased workload requiring additional processing capabilities. For example, a user of information handling system 100 may execute a computer-aided design (CAD) application installed on information handling system 100. In this example, information handling system 100 may be communicably coupled to peripheral devices 260 (via smart peripheral device 170) for presenting one or more results generated by the application to the user. However, processor subsystem 120 (illustrated in FIG. 1) of information handling system 100 may not support the processing capabilities required to execute the CAD application and to generate the one or more results locally on information handling system 100. Thus, information handling system 100 may send a query to smart peripheral device 170 requesting capabilities of smart peripheral device 170. Specifically, controller 240 may receive a query requesting capabilities inventory 210, or access to the capabilities described therein, such that information handling system 100 may determine whether smart peripheral device 170 includes the CAD application and supports the processing capabilities required to generate the one or more results. In response to receiving the query, controller 240 may access configuration policy 220 to determine one or more user permissions associated with user ID 200, generate capabilities inventory 210 based on the user permissions associated with the user of information handling system 100, and send capabilities inventory 210 to information handling system 100 as described above. Information handling system 100 may determine based on capabilities inventory 210 that smart peripheral device 170 includes the CAD application and supports the processing capabilities required to generate the one or more results. Here, information handling system 100 may send one or more commands to smart peripheral device 170 instructing controller 240 to execute the CAD application, generate the one or more results, and send the one or more results to peripheral devices 260 for presentation to the user. In addition, smart peripheral device 170 may send the one or more results to information handling system 100 for processing. In this example, information handling system 100 may execute an application shell of the CAD application executing on smart peripheral device 170. That is, information handling system 100 may execute an application shell comprised of the minimum software architecture (e.g., HTML, CSS, JavaScript, and the like) required to generate the application infrastructure while smart peripheral device 170 may generate the one or more results to be used within the application infrastructure. In another embodiment, information handling system 100 may offload one or more tasks to smart peripheral device 170 in response to determining that software and/or hardware required to perform the one or more tasks is not installed on, or otherwise supported by, information handling system 100.

Figure 3:
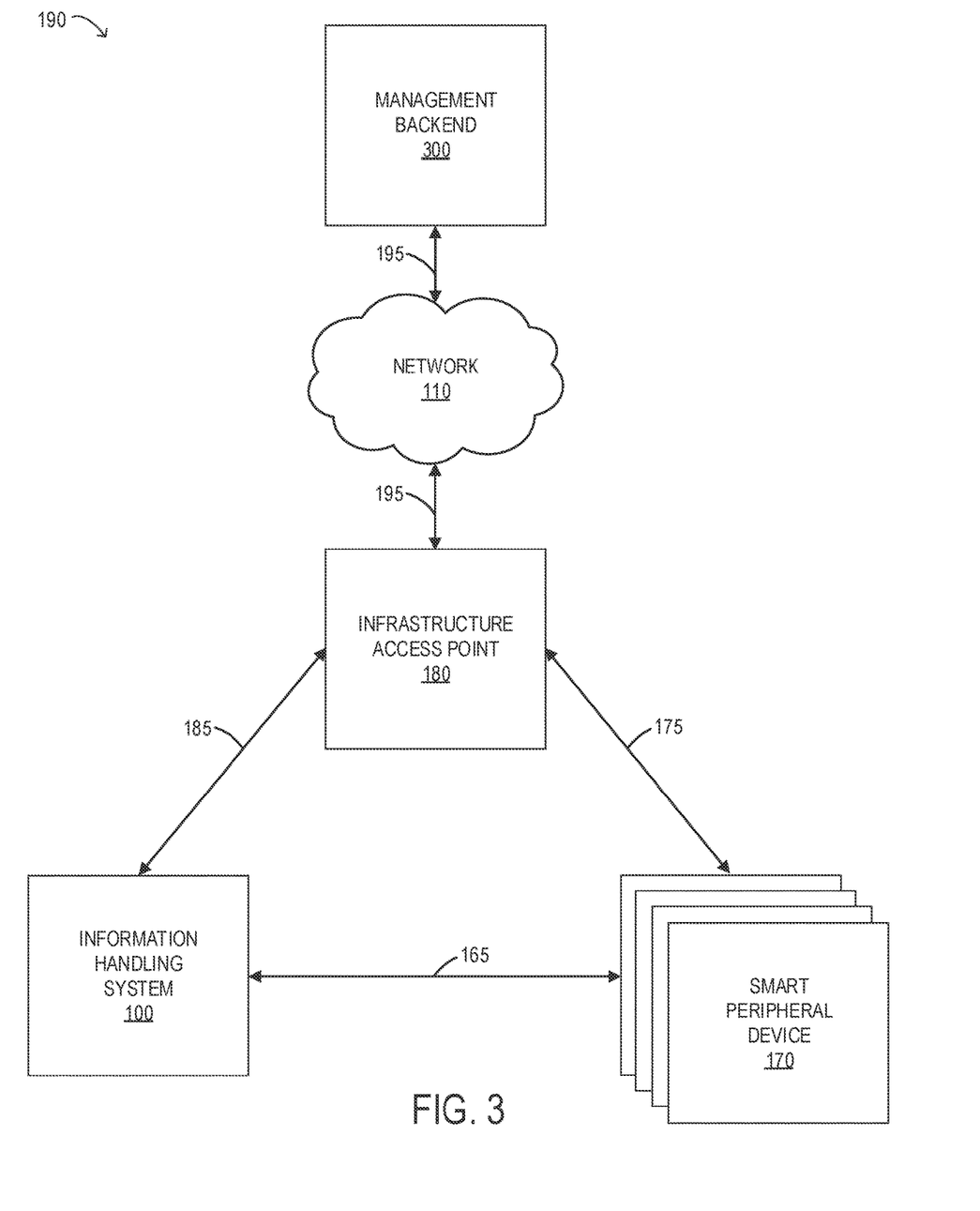
FIG. 3 is a block diagram of selected elements of an embodiment of a computing environment that includes a management backend.

FIG. 3 is a block diagram of selected elements of an embodiment of a computing environment that includes a management backend. In the embodiment illustrated in FIG. 3, computing environment 190 includes network 110, infrastructure access point 180, information handling system 100, and smart peripheral device 170 communicably coupled via connections 195, 185, 175, and 165 as described above with respect to FIGS. 1 and 2. In addition, computing environment 190 includes management backend 300 communicatively coupled to infrastructure access point 180 via network 110 over connection 195. In the embodiment illustrated in FIG. 3, smart peripheral device 170 is a docking station that includes capabilities inventory 210, configuration policy 220, and controller 240 as described above with respect to FIG. 2. Additionally, information handling system 100 includes user identification (ID) 200 as described above with respect to FIG. 2. It is noted that although computing environment 190 includes management backend 300, network 110, infrastructure access point 180, information handling system 100, and smart peripheral device 170 in the embodiment illustrated in FIG. 3, other embodiments of computing environment 190 may include additional, fewer, and/or different elements and connections.

In one embodiment, management backend 300 may be a suitable system, apparatus, or device operable to generate configuration policy 220 for smart peripheral device 170. In particular, management backend 300 may generate a dynamic configuration policy 220 for smart peripheral device 170 based on user ID 200. In the embodiment illustrated in FIG. 3, management backend 300 may be communicatively coupled to smart peripheral device 170 via network 110 and infrastructure access point 180 over connections 195 and 175, respectively. In response to receiving a query from information handling system 100 requesting capabilities inventory 210, or access to the capabilities described therein, smart peripheral device 170 (e.g., controller 240) may send user ID 200 to management backend 300 via infrastructure access point 180 and network 110 over connections 175 and 195. In response, management backend 300 may generate a dynamic configuration policy 220 for smart peripheral device 170 based on user ID 200. That is, management backend 300 may identify a user of information handling system 100 indicated by user ID 200 and may generate configuration policy 220 dynamically based on the user permissions associated with the user. In this way, management backend 300 may generate dynamic configuration policies for smart peripheral devices 170 within computing environment that may be updated, or otherwise modified, based on individual users of smart peripheral devices 170.

Upon generating configuration policy 220, management backend 300 may send configuration policy 220 to smart peripheral device 170 (via network 110 and infrastructure access point 180 over connections 195 and 175) such that smart peripheral device 170 may determine user permissions based on configuration policy 220, generate capabilities inventory 210 based on user permissions, and send capabilities inventory 210 to information handling system 100 as described above with respect to FIG. 2. In one embodiment, management backend 300 may additionally send configuration policy 220 to information handling system 100 via network 110 and infrastructure access point 180 over connections 195 and 185. In one embodiment, management backend 300 may be or include a microservice within a business enterprise operable to generate one or more configuration policies in accordance with standards (e.g., quality, ethical, security, and the like) maintained by the business enterprise. In other embodiments, management backend 300 may be or include an Information Technology Decision Maker (ITDM), a Business Decision Maker (BDM), and/or any other type of service or entity operable to generate configuration policies for smart peripheral device 170.

Figure 4:
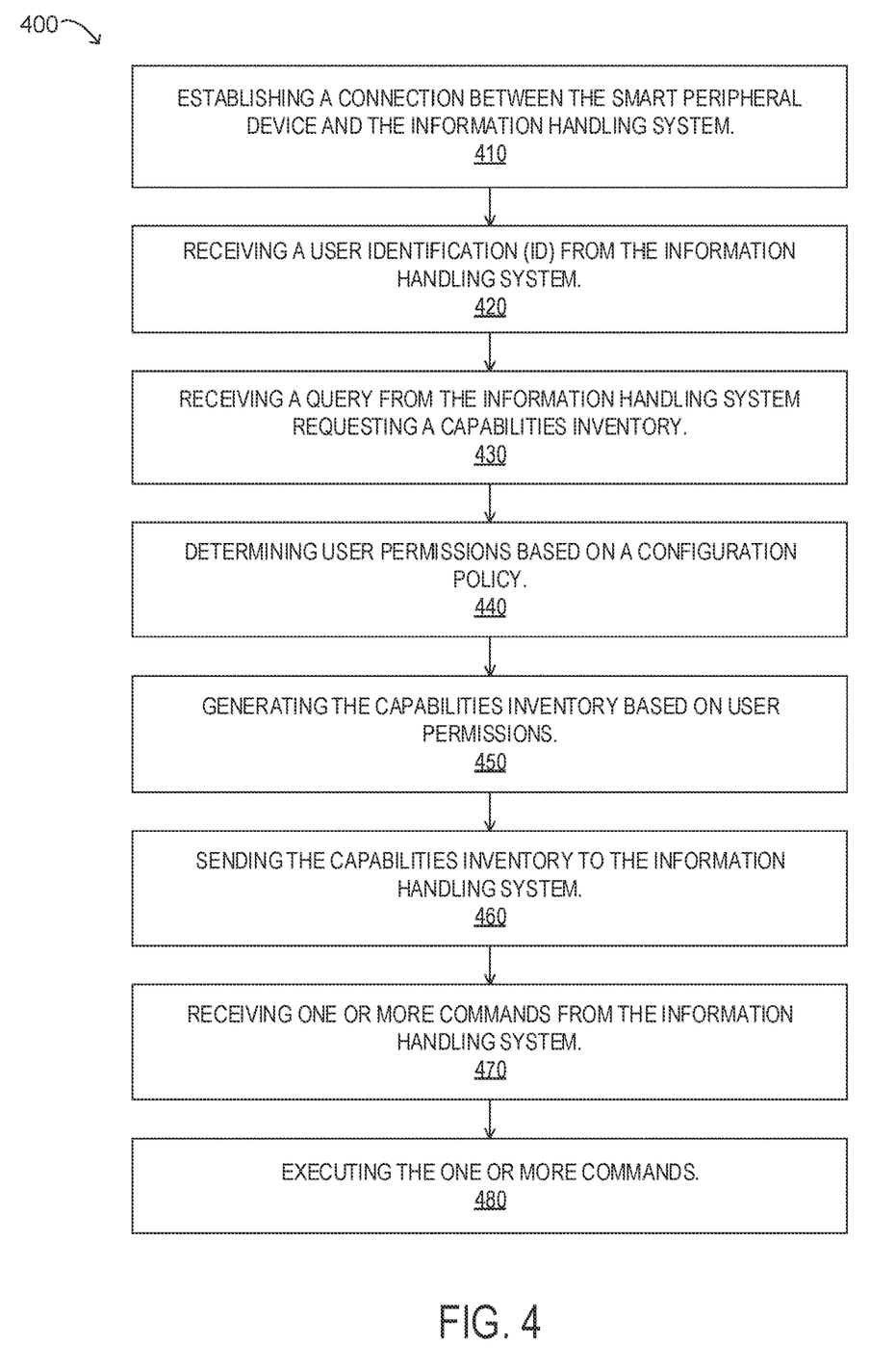
FIG. 4 is a flowchart depicting selected elements of an embodiment of a method for offloading one or more tasks from an information handling system to a smart peripheral device in a computing environment.

FIG. 4 is a flowchart depicting selected elements of an embodiment of a method for offloading one or more tasks from an information handling system to a smart peripheral device in a computing environment. It is noted that certain operations described in method 400 may be optional or may be rearranged in different embodiments.

Method 400 may begin at step 410, where the smart peripheral device may establish a connection between the smart peripheral device and the information handling system, communicatively coupling the smart peripheral device to the information handling system. For example, smart peripheral device 170 may establish connection 165 between smart peripheral device 170 and information handling system 100 as shown in FIGS. 1, 2, and 3. In step 420, the smart peripheral device may receive a user identification (ID) from the information handling system. The user ID may indicate a user of the information handling system. For example, smart peripheral device 170 may receive user ID 200 from information handling system 100 via connection 165 as shown in FIG. 2. In step 430, the smart peripheral device may receive a query from the information handling system requesting a capabilities inventory of the smart peripheral device. The capabilities inventory may indicate one or more tasks to be offloaded from the information handling system to the smart peripheral device. For example, smart peripheral device 170 may receive a query from information handling system 100 requesting capabilities inventory 210 as shown in FIG. 2. In step 440, the smart peripheral device may determine user permissions based on a configuration policy of the smart peripheral device. The configuration policy may indicate one or more permissions associated with the user ID. For example, smart peripheral device 170 may determine user permissions based on configuration policy 220 shown in FIG. 2. In step 450, the smart peripheral device may generate the capabilities inventory based on the user permissions. For example, smart peripheral device 170 may generate capabilities inventory 210 shown in FIG. 2 based on user permissions. In step 460, the smart peripheral device may send the capabilities inventory to the information handling system. For example, smart peripheral device 170 may send capabilities inventory 210 to information handling system 100 via connection 165 as shown in FIG. 2. In step 470, the smart peripheral device may receive one or more commands from the information handling system. The one or more commands may indicate one or more tasks to be offloaded from the information handling system to the smart peripheral device. For example, smart peripheral device 170 may receive one or more commands from information handling system 100 via connection 165 as shown in FIG. 3. In step 480, the smart peripheral device may execute the one or more commands. For example, smart peripheral device 170 may encode data streams received from peripheral devices 260 and may send the encoded data streams directly to network 110 via infrastructure access point 180 over connection 175 rather than sending the encoded data streams to information handling system 100 over connection 165 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A smart peripheral device configured to offload one or more tasks from an information handling system to the smart peripheral device in a computing environment, the smart peripheral device comprising:
   a controller; and
   a memory medium coupled to the controller that includes instructions executed by the controller causing the smart peripheral device to:
   establish a connection between the smart peripheral device and the information handling system, the connection communicably coupling the smart peripheral device to the information handling system;
   receive a user identification (ID) from the information handling system, the user ID indicating a user of the information handling system;
   receive a query from the information handling system, the query requesting a capabilities inventory of the smart peripheral device, the capabilities inventory indicating the one or more tasks to be offloaded from the information handling system to the smart peripheral device;
   determine user permissions based on a configuration policy of the smart peripheral device, the configuration policy indicating one or more permissions associated with the user ID;
   generate the capabilities inventory based on the user permissions;
   send the capabilities inventory to the information handling system;
   receive one or more commands from the information handling system, the one or more commands indicating the one or more tasks to be offloaded from the information handling system to the smart peripheral device; and
   execute the one or more commands.

2. The smart peripheral device of claim 1, wherein to determine user permissions based on the configuration policy of the smart peripheral device, the instructions further cause the smart peripheral device to:
   send the user ID to a management backend of the computing environment, the management backend configured to generate the configuration policy based on the user ID; and
   receive the configuration policy from the management backend.

3. The smart peripheral device of claim 1, wherein to execute the one or more commands, the instructions further cause the smart peripheral device to:
   receive a plurality of data streams from a plurality of peripheral devices communicatively coupled to the smart peripheral device;
   encode the plurality of data streams;
   refrain from sending the encoded plurality of data streams to the information handling system; and
   send the encoded plurality of data streams to an infrastructure access point of the computing environment, the infrastructure access point communicatively coupling the smart peripheral device to a network of the computing environment.

4. The smart peripheral device of claim 1, wherein to execute the one or more commands, the instructions further cause the smart peripheral device to:
   receive an encoded data stream from the information handling system, the encoded data stream sent to the information handling system from an infrastructure access point of the computing environment, the infrastructure access point communicatively coupling the information handling system to a network of the computing environment;
   decode the encoded data stream; and
   send the decoded data stream to a plurality of peripheral devices for presentation to the user of the information handling system, the plurality of peripheral devices communicatively coupled to the smart peripheral device.

5. The smart peripheral device of claim 1, wherein to execute the one or more commands, the instructions further cause the smart peripheral device to:
   execute an application via an operating system of the smart peripheral device, the application generating one or more results;
   send the one or more results to the information handling system for processing; and
   send the one or more results to a plurality of peripheral devices for presentation to the user of the information handling system, the plurality of peripheral devices communicatively coupled to the smart peripheral device.

6. The smart peripheral device of claim 1, wherein the connection between the smart peripheral device and the information handling system is a wireless data connection.

7. The smart peripheral device of claim 6, wherein the wireless data connection is associated with a media-agnostic universal serial bus (MA-USB) protocol.

8. A method for offloading one or more tasks from an information handling system to a smart peripheral device in a computing environment, the method comprising:
   establishing, by the smart peripheral device, a connection between the smart peripheral device and the information handling system, the connection communicatively coupling the smart peripheral device to the information handling system;
   receiving, by the smart peripheral device, a user identification (ID) from the information handling system, the user ID indicating a user of the information handling system;

receiving, by the smart peripheral device, a query from the information handling system, the query requesting a capabilities inventory of the smart peripheral device, the capabilities inventory indicating the one or more tasks to be offloaded from the information handling system to the smart peripheral device;

determining, by the smart peripheral device, user permissions based on a configuration policy of the smart peripheral device, the configuration policy indicating one or more permissions associated with the user ID;

generating, by the smart peripheral device, the capabilities inventory based on the user permissions;

sending, by the smart peripheral device, the capabilities inventory to the information handling system;

receiving, by the smart peripheral device, one or more commands from the information handling system, the one or more commands indicating the one or more tasks to be offloaded from the information handling system to the smart peripheral device; and executing, by the smart peripheral device, the one or more commands.

9. The method of claim 8, wherein determining user permissions based on the configuration policy of the smart peripheral device comprises:
sending, by the smart peripheral device, the user ID to a management backend of the computing environment;
generating, by the management backend, the configuration policy based on the user ID; and
receiving, by the smart peripheral device, the configuration from the management backend.

10. The method of claim 8, wherein executing the one or more commands comprises:
receiving, by the smart peripheral device, a plurality of data streams from a plurality of peripheral devices communicatively coupled to the smart peripheral device;
encoding, by the smart peripheral device, the plurality of data streams;
refraining, by the smart peripheral device, from sending the encoded plurality of data streams to the information handling system; and
sending, by the smart peripheral device, the encoded plurality of data streams to an infrastructure access point of the computing environment, the infrastructure access point communicatively coupling the smart peripheral device to a network of the computing environment.

11. The method of claim 8, wherein executing the one or more commands comprises:
receiving, by the information handling system, an encoded data stream from an infrastructure access point of the computing environment, the infrastructure access point communicatively coupling the information handling system to a network of the computing environment;
sending, by the information handling system, the encoded data stream to the smart peripheral device;
receiving, by the smart peripheral device, the encoded data stream from the information handling system;
decoding, by the smart peripheral device, the encoded data stream; and
sending, by the smart peripheral device, the decoded data stream to a plurality of peripheral devices for presentation to the user of the information handling system, the plurality of peripheral devices communicatively coupled to the smart peripheral device.

12. The method of claim 8, wherein executing the one or more commands comprises:
executing, by the smart peripheral device, an application via an operating system of the smart peripheral device, the application generating one or more results;
sending, by the smart peripheral device, the one or more results to the information handling system for processing; and
sending, by the smart peripheral device, the one or more results to a plurality of peripheral devices for presentation to the user of the information handling system, the plurality of peripheral devices communicatively coupled to the smart peripheral device.

13. The method of claim 8, wherein the connection between the smart peripheral device and the information handling system is a wireless data connection.

14. The method of claim 13, wherein the wireless data connection is associated with a media-agnostic universal serial bus (MA-USB) protocol.

15. A computing environment, comprising:
an information handling system including one or more processors; and
a smart peripheral device including:
a controller; and
a memory medium coupled to the controller that includes instructions executed by the controller causing the smart peripheral device to:
establish a connection between the smart peripheral device and the information handling system, the connection communicably coupling the smart peripheral device to the information handling system;
receive a user identification (ID) from the information handling system, the user ID indicating a user of the information handling system;
receive a query from the information handling system, the query requesting a capabilities inventory of the smart peripheral device, the capabilities inventory indicating one or more tasks to be offloaded from the information handling system to the smart peripheral device;
determine user permissions based on a configuration policy of the smart peripheral device, the configuration policy indicating one or more permissions associated with the user ID;
generate the capabilities inventory based on the user permissions;
send the capabilities inventory to the information handling system;
receive one or more commands from the information handling system, the one or more commands indicating the one or more tasks to be offloaded from the information handling system to the smart peripheral device; and
execute the one or more commands.

16. The computing environment of claim 15, wherein to determine user permissions based on the configuration policy of the smart peripheral device, the instructions further cause the smart peripheral device to:
send the user ID to a management backend of the computing environment, the management backend configured to generate the configuration policy based on the user ID; and
receive the configuration policy from the management backend.

17. The computing environment of claim 15, wherein to execute the one or more commands, the instructions further cause the smart peripheral device to:
- receive a plurality of data streams from a plurality of peripheral devices communicatively coupled to the smart peripheral device;
- encode the plurality of data streams;
- refrain from sending the encoded plurality of data streams to the information handling system; and
- send the encoded plurality of data streams to an infrastructure access point of the computing environment, the infrastructure access point communicatively coupling the smart peripheral device to a network of the computing environment.

18. The computing environment of claim 15, wherein to execute the one or more commands, the instructions further cause the smart peripheral device to:
- receive an encoded data stream from the information handling system, the encoded data stream sent to the information handling system from an infrastructure access point of the computing environment, the infrastructure access point communicatively coupling the information handling system to a network of the computing environment;
- decode the encoded data stream; and
- send the decoded data stream to a plurality of peripheral devices for presentation to the user of the information handling system, the plurality of peripheral devices communicatively coupled to the smart peripheral device.

19. The computing environment of claim 15, wherein to execute the one or more commands, the instructions further cause the smart peripheral device to:
- execute an application via an operating system of the smart peripheral device, the application generating one or more results;
- send the one or more results to the information handling system for processing; and
- send the one or more results to a plurality of peripheral devices for presentation to the user of the information handling system, the plurality of peripheral devices communicatively coupled to the smart peripheral device.

20. The computing environment of claim 15, wherein the connection between the smart peripheral device and the information handling system is a wireless data connection.

* * * * *